United States Patent
Kim et al.

(10) Patent No.: US 10,667,153 B2
(45) Date of Patent: May 26, 2020

(54) NETWORK SELECTION METHOD AND APPARATUS THEREFOR

(71) Applicant: Samsung Electronics Co., Ltd., Suwon-si, Gyeonggi-do (KR)

(72) Inventors: Ji Hwan Kim, Suwon-si (KR); Han Sung Leem, Suwon-si (KR); Hye Jeong Kim, Suwon-si (KR); Jung Hoon Ahn, Seoul (KR); Jun Keun Yoon, Suwon-si (KR); Ju Hee Jang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 15/701,070

(22) Filed: Sep. 11, 2017

(65) Prior Publication Data

US 2018/0077592 A1 Mar. 15, 2018

(30) Foreign Application Priority Data

Sep. 9, 2016 (KR) .......................... 10-2016-0116767

(51) Int. Cl.
*H04W 24/08* (2009.01)
*H04L 29/06* (2006.01)
(Continued)

(52) U.S. Cl.
CPC ......... *H04W 24/08* (2013.01); *H04L 43/0888* (2013.01); *H04L 65/4069* (2013.01); *H04L 65/4084* (2013.01); *H04L 65/80* (2013.01); *H04W 24/02* (2013.01); *H04L 65/1069* (2013.01); *H04L 67/02* (2013.01); *H04W 48/18* (2013.01); *H04W 88/06* (2013.01)

(58) Field of Classification Search
None
See application file for complete search history.

(56) References Cited

U.S. PATENT DOCUMENTS 9,514,280 B2 12/2016 Kang et al.
2007/0061469 A1* 3/2007 Rhim ................... H04L 65/4069
709/227

(Continued)

FOREIGN PATENT DOCUMENTS

KR 10-2014-0015964 A 2/2014

*Primary Examiner* — Rebecca E Song

(57) ABSTRACT

The present disclosure relates to content streaming. An electronic device includes a processor configured to execute an application that communicates with a server using a pre-defined secure protocol. The electronic device also includes both a communication circuit configured to receive content associated with the application through a first network from a server, and a buffer configured to store the received content. The communication circuit determines a state of the buffer, and terminates a session established between the electronic device and the server based on the state of the buffer and signal state of a second network. The communication circuit also establishes a new session between the electronic device and the server through the second network. The communication circuit also measures a data throughput of the second network for the server during a measuring time, and, if the measured data throughput meets a condition, receives the content through the second network.

16 Claims, 11 Drawing Sheets

(51) Int. Cl.
*H04L 12/26* (2006.01)
*H04W 24/02* (2009.01)
H04W 48/18 (2009.01)
H04L 29/08 (2006.01)
H04W 88/06 (2009.01)

(56) References Cited

U.S. PATENT DOCUMENTS

| | | | | |
|---|---|---|---|---|
| 2009/0141661 A1* | 6/2009 | Li | ............ | H04W 76/27 |
| | | | | 370/311 |
| 2014/0022932 A1* | 1/2014 | Park | ............ | H04W 36/14 |
| | | | | 370/253 |
| 2014/0032197 A1 | 1/2014 | Kang et al. | | |
| 2014/0122344 A1* | 5/2014 | Foulds | ............ | G06Q 20/38215 |
| | | | | 705/67 |
| 2014/0241322 A1* | 8/2014 | Kim | ............ | H04W 36/0016 |
| | | | | 370/331 |
| 2014/0323087 A1* | 10/2014 | Huang | ............ | H04W 48/16 |
| | | | | 455/411 |
| 2014/0349647 A1* | 11/2014 | Chen | ............ | H04W 36/30 |
| | | | | 455/436 |
| 2017/0013493 A1* | 1/2017 | HomChaudhuri | ............ | |
| | | | | H04W 72/0486 |

* cited by examiner

NETWORK SELECTION METHOD AND APPARATUS THEREFOR

CROSS-REFERENCE TO RELATED APPLICATION AND CLAIM OF PRIORITY

This application is related to and claims priority to Korean Application No. 10-2016-0116767, filed on Sep. 9, 2016, the contents of which are incorporated herein by reference.

TECHNICAL FIELD

The present disclosure relates to technologies for selecting a network in a terminal.

BACKGROUND

A mobile device, such as a smartphone, may support a cellular network such as third generation (3G) or long term evolution (LTE). In addition, a wireless communication technology, such as wireless-fidelity (Wi-Fi), conforming to a specific data transfer protocol (e.g., the institute of electrical and electronics engineers (IEEE) 802.11) may be supported by the mobile device. In addition, a wireless communication technology, such as Bluetooth, conforming to IEEE 802.15.1 may be supported by the mobile device.

Each of the wireless communication technologies may provide different data throughputs (TPs) according to a used frequency band or a unique technology feature. Such a data throughput may vary within a theoretical maximum value according to the number of mobile devices (referred to as user equipment (UE)) connected to a network or an access point (AP).

For example, a terminal which receives a streaming service through a cellular network may verify signal state of Wi-Fi networks available near the terminal. If Wi-Fi signal state is good and if the terminal receives a streaming service through the Wi-Fi network, a charge for using a network may be reduced in view of the terminal and a load of the network may be reduced in view of a mobile network operator (MNO).

SUMMARY

According to a service provider who providers a video service, different protocols may be used when content is provided to a terminal. For example, any service provider may provide content through a general protocol such as a hypertext transfer protocol (HTTP). However, another service provider may provide content through a secure protocol such as an HTTP over secure socket layer (HTTPS).

It is impossible for an application which uses the HTTPS to open an additional session to a Wi-Fi network in a state where the application is connected to a cellular network and transmit and receive traffic. Further, since it is impossible to verify additional information such as metadata through the HTTPS, it is difficult to determine to switch a network.

Thus, the application which uses the HTTPS should actually switch from the cellular network to the Wi-Fi network and may determine traffic to measure conditions of the Wi-Fi network. However, for example, if the application is an application which provides a video streaming service and if data of served content is not sufficiently stored in a buffer, playback of content may be disconnected or deterioration in quality may be caused during a time of switching to the Wi-Fi network and measuring network state.

Aspects of the present disclosure are to address at least the above-mentioned problems and/or disadvantages and to provide at least the advantages described below.

In accordance with an aspect of the present disclosure, an electronic device is provided. The electronic device may include a processor configured to execute an application that communicates with a server using a secure protocol, a communication circuit configured to receive content associated with the application through a first network from a server, and a buffer configured to store the received content. The communication circuit may be configured to determine a state of the buffer, terminate a session established between the electronic device and the server through the first network based on the state of the buffer and signal state of a second network, establish a new session between the electronic device and the server through the second network, and measure a data throughput of the second network for the server during a measuring time, and, if the measured data throughput meets a pre-defined condition, receive the content through the second network.

In accordance with another aspect of the present disclosure, a method is provided. The method may include receiving data using secure protocol through a first network from a server, determining a state of a buffer that stores the data, terminating a session established between the electronic device and the server through the first network based on the state of the buffer and signal state of a second network, establishing a new session between the electronic device and the server through the second network, and measuring a data throughput of the second network for the server during a measuring time, and, if the measured data throughput meets a pre-defined condition, receiving the content through the second network.

According to embodiments disclosed in the present disclosure, an application which streams data using a secure protocol such as an HTTPS may efficiently download using different networks.

In addition, a variety of effects directly or indirectly ascertained through the present disclosure may be provided.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
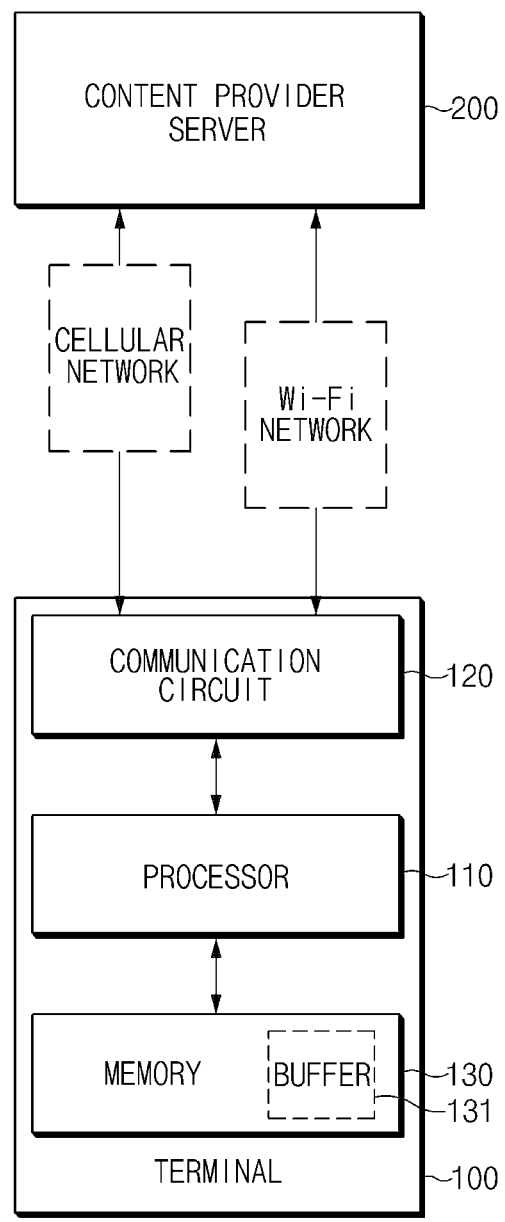
FIG. 1 illustrates a block diagram of a communication environment using a plurality of networks according to an embodiment.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of another embodiment. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™, electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MM), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

The following is a list of acronyms used in the present disclosure. Acronyms which are not defined below may be defined when initially used in the present disclosure. In case of some acronyms which are obvious to those skilled in the art, definitions thereof will be omitted below.

A4WP: Alliance for Wireless Power
AP: application processor
ASK: amplitude-shift keying
CEP: control error packet
CP: communication processor
FSK: frequency-shift keying
IF: interface
INT: interrupt
PHM: power hold mode
PHP: power hold packet
PMA: Power Matters Alliance
PMIC: power management integrated circuit
PRx: Power Receiver
PTx: Power Transmitter
SSP: signal strength packet
WPC: Wireless Power Consortium Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 is a block diagram illustrating a communication environment using a plurality of networks according to an embodiment.

Referring to FIG. 1, a terminal 100 may communicate with a server 200 through different networks. For example, the terminal 100 may download data using a first network from the server 200 and may download data using a second network different from the first network from the server 200.

According to an embodiment, the first network may correspond to a paid network, and the second network may correspond to a free network. Additionally or alternatively, the first network may correspond to a frequency band the terminal 100 authenticated by a mobile network operator (MNO) may exclusively access. The second network may correspond to a frequency band all terminals may freely access. For example, a terminal joined in a specific MNO may access a cellular network, and all terminals may access a wireless-fidelity (Wi-Fi) network of a 2.4 or 5 GHz frequency band. In the present disclosure, for convenience of description, it may be assumed that the first network is the cellular network (e.g., third generation (3G), 4G, 5G, long term evolution (LTE), LTE-advanced (LTE-A), or the like) and that the second network is the Wi-Fi network. However, such an assumption is an example. Networks having different features in cost, communication standard, tariff, or the like may correspond to the first network and the second network which are disclosed in the present disclosure.

The terminal 100 may include a processor 110, a communication circuit 120, and a memory 130. In an embodiment, the processor 110 may be referred to as an application processor (AP), and the communication circuit 120 may be referred to as a communication processor (CP). The communication circuit 120 may include a first module for supporting the cellular network and a second module for supporting the Wi-Fi network or may be electrically connected with the first module and the second module. For example, the first module may correspond to a cellular module, and the second module may correspond to a Wi-Fi module. Each module may include an antenna for transmitting/receiving a signal of a frequency band corresponding to each network, and an amplification circuit, a filter circuit, and the like for signal processing. In an embodiment, the cellular module and the Wi-Fi module may be implemented as a radio frequency (RF) block included in the communication circuit 120 or may be implemented as an RF block/circuit independent of the communication circuit 120.

The terminal 100 may include the memory 130. One or more applications may be stored in the memory 130. For example, a streaming application for downloading video content, such as a drama, a movie, or a documentary, from the content provider server 200 and outputting the video content on a display may exist in the memory 130. Further, an audio application for downloading audio data, such as music, radio, or a podcast, from the content provider server 200 and outputting the downloaded audio data via a speaker may exist in the memory 130.

A buffer 131 may be included in the memory 130. For example, the processor 110 may assign part of a logical address of the memory 130 to the buffer 131. Content download from the server 200 may be stored in the buffer 131 for playback.

In an embodiment, the memory 130 may include a plurality of memory devices. In this case, a memory device which stores an application and a memory device used as a buffer may differ from each other.

In another embodiment, the buffer 131 may be implemented in the communication circuit 120 or may be implemented as a memory device directly connected with the communication circuit 120. The communication circuit 120 may store data received from the server 200 in the buffer 131 of the communication circuit 120 or the buffer 131 linked with the communication circuit 120. If data stored in the buffer 131 is played back by the processor 110, the played back data may be deleted immediately or after a time.

In addition, the terminal 100 may further include elements, such as a display, which are not shown in FIG. 1. A description will be given below of an extended element which may be included in the terminal 100.

The server 200 may provide content to the terminal 100 according to a request from the terminal 100. Although not illustrated, the server 200 may further include a control unit for controlling an overall operation of the server 200. The control unit may be implemented with a plurality of processors. The control unit may perform scheduling of the terminal 100 which accesses the server 200, assignment of wireless resources available by the terminal, and the like.

In an embodiment, the server 200 may include one or more server devices. For example, a server associated with the cellular network, a server associated with the Wi-Fi network, and/or additional servers associated with countries, MNOs, or users may be connected with the terminal 100. For example, if the terminal 100 accesses the server 200 through the cellular network, a session may be generated between a first server and the terminal 100. If the terminal 100 accesses the server 200 through the Wi-Fi network, a session may be generated between a second server and the terminal 100. Herein, both of the first server and the second server may be included in the server 200.

A session connection using the cellular network or the Wi-Fi network may be established between the server 200 and the terminal 100. The server 200 and the terminal 100 may communicate with each other using different protocols according to an application. For example, an application, such as YouTube or Facebook, may communicate with a server of a content provider using a secure protocol such as hypertext transfer protocol over secure socket layer (HTTPS).

However, any broadcaster application or any streaming application may communicate with a server using a general protocol which is not secured. For example, an application using an HTTP may establish an end-to-end connection (i.e., the session connection) between the terminal and the server 200, may transmit and receive dummy traffic through the session connection, and may measure a real speed of a network between the terminal 100 and the server 200. In the present disclosure, a description will be given of various embodiments with respect to an application which communicates with the server 200 through the secure protocol such as the HTTPS.

Figure 2:
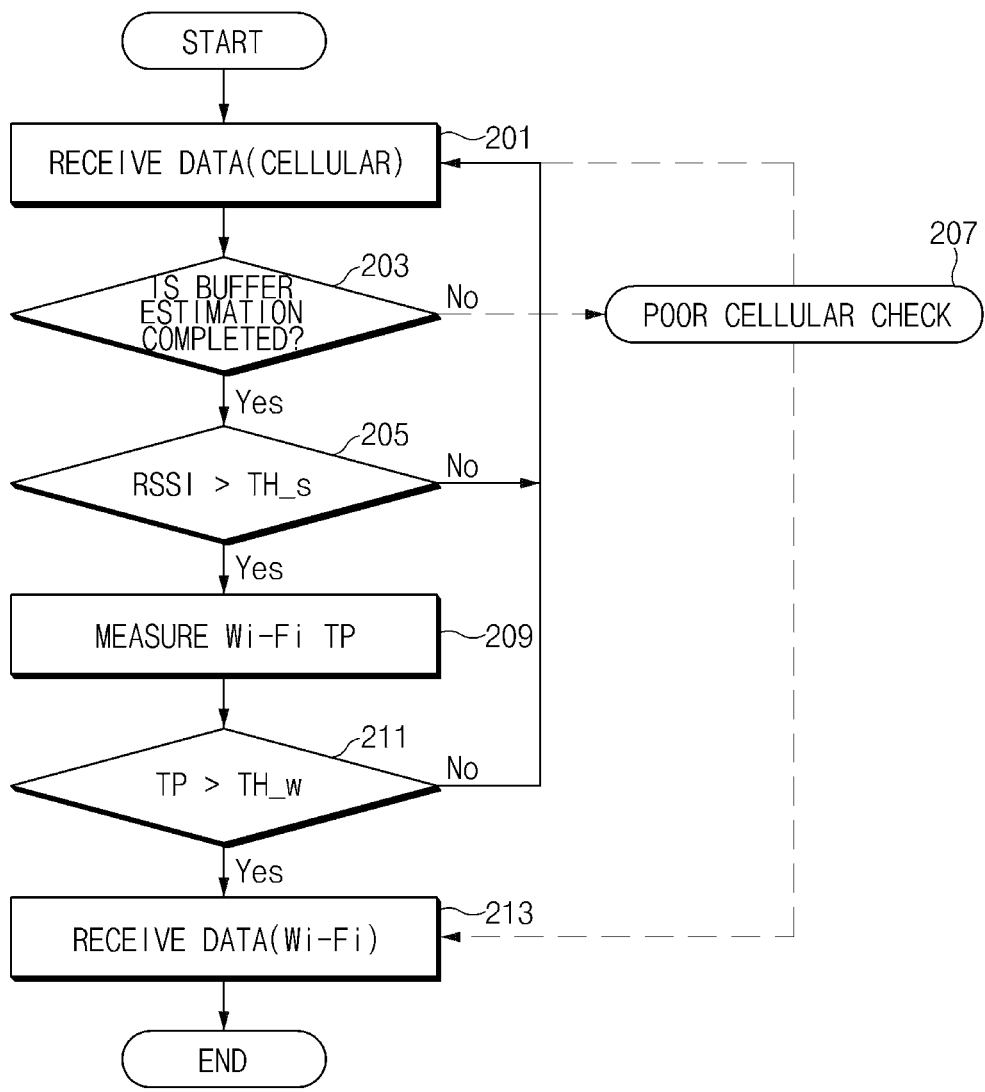
FIG. 2 illustrates a flowchart of a process of switching a data receive path from a cellular network to a wireless-fidelity (Wi-Fi) network according to an embodiment.

FIG. 2 is a flowchart illustrating a process of switching a data receive path from a cellular network to a Wi-Fi network according to an embodiment.

Referring to FIG. 2, in operation 201, a terminal 100 of FIG. 1 may receive data through a cellular network from a server 200 of FIG. 1. For example, a user of the terminal 100 may execute a Netflix™ application and may view a movie provided from Netflix™. While the user views the movie, the terminal may receive (stream) movie data through the cellular network from the server 200. If network state is good, the received data may be fully stored in a buffer 131 of FIG. 1, and the movie may be seamlessly played back. For example, if a speed at which data is stacked in the buffer 131 is faster than a speed at which data is exhausted by the playback of the movie, the terminal 100 may seamlessly play back the movie. On the other hand, if the network state is poor, for example, if the speed at which the data is exhausted by the playback of the movie is faster than the speed at which the data is stacked in the buffer 131, a phenomenon in which playback of the movie is momentarily disconnected may occur.

While the data is received, in operation 203, the terminal 100 may determine or estimate a state of the buffer 131 and may determine whether buffer estimation is completed. The buffer estimation may be referred to as buffer determination. The terminal 100 may directly measure an amount of data which is stacked in the buffer 131 and may measure the state of the buffer 131 using another method. The terminal 100 may determine criteria and a determining time for determining conditions of a Wi-Fi network, through the buffer estimation. A description will be given in detail of the method of measuring the state of the buffer 131 at the terminal 100 with reference to FIGS. 3 to 5.

In an embodiment, if the buffer estimation is completed, in operation 205, the terminal 100 may determine signal strength such as a received signal strength indication (RSSI) of the Wi-Fi network. For example, the terminal 100 may determine whether the RSSI of the Wi-Fi network is greater than or equal to a threshold value (e.g., a threshold value TH_s) of signal quality set as a result of the buffer estimation. In another embodiment, the terminal 100 may perform operation 205 using another index indicating another signal strength rather than an RSSI or signal quality. In the present disclosure, for convenience of description, a description will be given with respect to an RSSI value.

If the measured RSSI value is less than the threshold value determined through the buffer estimation, in operation 207, the terminal 100 may determine whether current conditions of the cellular network are poor. In an embodiment, in a state where the buffer estimation is not completed, the terminal 100 may determine whether the current conditions of the cellular network correspond to poor conditions. An operation of determining whether the cellular network is in poor conditions of a level or less and an operation of the terminal 100 according to the determined result will be described below with reference to FIGS. 7 and 8.

In an embodiment, operation 207 of determining whether the cellular network is in the poor conditions may be omitted. In this case, after performing operations 203, 205, and 211, the terminal 100 may perform operation 201 without performing operation 207. In other words, if it is determined that there is no situation to use a Wi-Fi network, the terminal 100 may receive data through the cellular network irrespective of whether cellular conditions are poor.

In operation 209, the terminal 100 may measure a data throughput (TP) of the Wi-Fi network during a time permitted as a result of the buffer estimation. Herein, in some embodiments, a time for measuring the data throughput of the Wi-Fi network may be previously specified.

For example, the terminal 100 may terminate at least one of a session(s) established between the terminal 100 and the server 200 through the cellular network and may establish at least one new session between the terminal 100 and the server 200 through the Wi-Fi network. The terminal 100 may actually receive data through the Wi-Fi network from the server 200 through this session and may determine whether a sufficient data throughput is guaranteed when switching a download path of the data from the cellular network to the Wi-Fi network.

In an embodiment, the terminal 100 may establish only predefined some sessions, such as a streaming data session, among a plurality of sessions through the Wi-Fi network. Other sessions except for the predefined session, for example, sessions for transmitting and receiving other data, such as domain name system (DNS), except for streaming data may be left in the cellular network.

In operation 211, the terminal 100 may compare the measured data throughput with a threshold value TH_w for switching to Wi-Fi. If the data throughput is greater than the threshold value TH_w, the terminal 100 may receive data after operation 213 through the Wi-Fi network from the server 200. In an embodiment, if it is determined that a data throughput of the Wi-Fi network is sufficient, the terminal 100 may establish all sessions which are left, for receiving other data such as DNS information, except for a streaming data session for receiving streaming data, through the Wi-Fi network and may receive all data through the Wi-Fi network. If the data throughput is less than the threshold value TH_w, the terminal 100 may check conditions of the cellular network in operation 207 and/or may perform operation 201.

Figure 3:
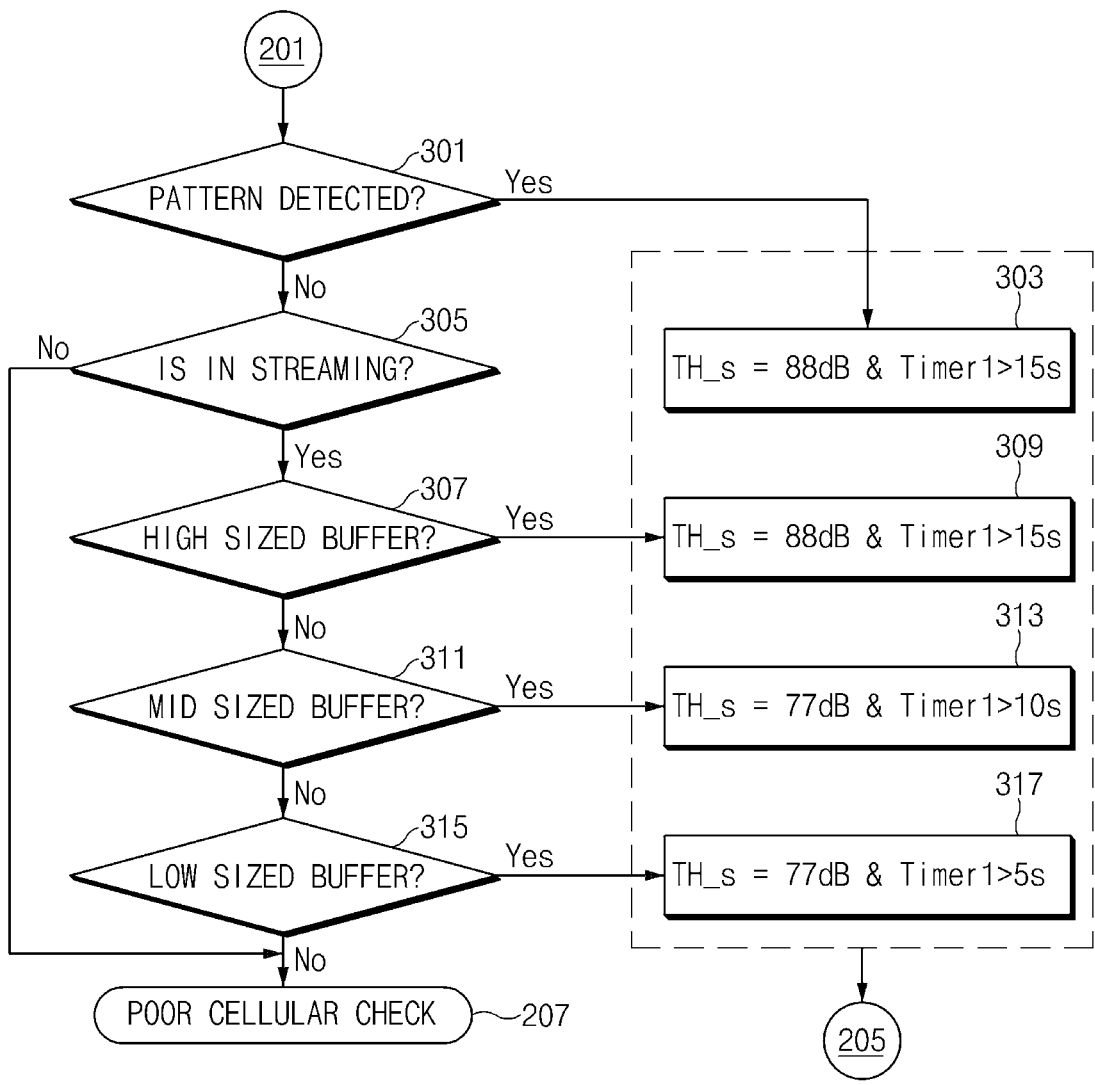
FIG. 3 illustrates a flowchart of a process for determining a state of a buffer according to an embodiment.

FIG. 3 is a flowchart illustrating a process of determining a state of a buffer according to an embodiment. FIG. 3 may be understood as detailed operations of operation 203 of FIG. 2.

Referring to FIG. 3, in operation 301, a terminal 100 of FIG. 1 may determine whether a download traffic pattern of a specified form is indicated. For example, if communication conditions are very good and if sufficient data are stacked in a buffer 131 of FIG. 1, the terminal 100 may exhaust data which are stacked in the buffer 131 during an idle time rather than continuing receiving data from a server 200 and may receive data again from the server 200. In other words, if such a pre-defined pattern is detected, the terminal 100 may determine current communication conditions of a cellular network or a state of the buffer 131 as the best state.

If a specified pattern is indicated, in operation 303, the terminal 100 may set a threshold value TH_s of an RSSI for measuring a Wi-Fi network to 88 dB. This RSSI value may be an example and may be understood as a suitable first RSSI value. Further, in operation 303, the terminal 100 may determine a time permitted to measure a Wi-Fi signal, based on an idle time (e.g., a time length or the like) indicated in the specified pattern. This time may be referred to as a Wi-Fi measuring time. In operation 303, the Wi-Fi measuring time may be set to be longer than a Wi-Fi measuring time if it is determined that a level of the buffer 131 is high. For example, in operation 303, the Wi-Fi measuring time may be set to be longer than 15 seconds. A method of detecting a specified pattern and a process of determining a Wi-Fi measuring time according to pattern detection will be described below with reference to FIGS. 4 and 5.

If the specified pattern is not indicated, in operation 305, the terminal 100 may determine whether data is currently streamed. For example, the terminal 100 may determine whether a reception speed of the data is kept 50 kbps or more. If the reception speed of the data is reduced to less than 50 kbps, the terminal 100 may determine that a streaming state is released and may check cellular conditions (e.g., operation 207).

In an embodiment, the terminal 100 may determine a state of the buffer 131 as three stages of a high state, a mid state, and a low state. However, in another embodiment, the terminal 100 may determine the state of the buffer 131 as any one of two stages or four or more stages. Further, the terminal 100 may set at least one of a threshold value of an RSSI and a Wi-Fi measuring time per stage in a different way. In FIG. 3, if the specified pattern is not detected, a description will be given of an embodiment of classifying the state of the buffer 131 into the three stages.

In operation 307, the terminal 100 may determine whether the state of the buffer 131 is the high state (a high sized buffer). For example, the terminal 100 may determine the state of the buffer 131 as the high state based on an amount of data stored in the buffer 131, a download speed, a download time, or the like. For example, if the terminal 100 streams data of 90 Mbytes or more within 30 seconds, it may determine the state of the buffer 131 as the high state. Detailed numeric values may be set in a different way in another embodiment.

If the state of the buffer 131 is the high state, in operation 309, the terminal 100 may set the threshold value of the RSSI to 88 dB and may set a Wi-Fi measuring time to 15 seconds. Similar to the above-mentioned details, such numeric values are examples. The threshold value of the RSSI set in operation 309 may be the same as a first RSSI value, and the 15 seconds may be understood as a first measuring time.

If the state of the buffer 131 does not correspond to the high state, in operation 311, the terminal 100 may determine whether the state of the buffer 131 is a middle state (a mid-sized buffer). For example, when receiving data determined as a streaming packet during 15 seconds or more, if an average download speed is 1 Mbps, the terminal 100 may determine the state of the buffer 131 as the middle state. If the average download speed is less than 1 Mbps, but if it is greater than or equal to 300 kbps, in operation 315, the terminal 100 may determine the state of the buffer 131 as the low state. Herein, the data determined as the steaming packet may correspond to data having a throughput of 50 kbps or more. Detailed numeric values may be set in a different way in another embodiment.

If the state of the buffer 131 corresponds to the middle state, in operation 313, the terminal 100 may set the threshold value of the RSSI to 77 dB. This RSSI value may be an example and may be understood as a proper second RSSI value. The second RSSI may be set to mean signal strength or signal quality which is lower than the first RSSI value. Further, the Wi-Fi measuring time may be set to be lower (e.g., 10 seconds) than the above state (e.g., 15 seconds) of the buffer 131.

If the state of the buffer 131 corresponds to the low state, in operation 317, the terminal 100 may set the threshold value of the RSSI and the Wi-Fi measuring time. In operation 317, at least one of the threshold value of the RSSI and the Wi-Fi measuring time, which are set in operation 317, may be set to be more disadvantageous than the threshold value of the RSSI and the Wi-Fi measuring time, which are set in operation 313. For example, the threshold value of the RSSI may be set to 77 dB to the same as that of the middle state of the buffer 131, and the Wi-Fi measuring time may be set to 5 seconds to be shorter than that of the middle state of the buffer 131.

For example, the terminal 100 may determine the state of the buffer 131 as any one of a first state and a second state which is lower than the first state. In other words, more data may be stored in the buffer 131 of the first state than the buffer 131 of the second state. This means that, if the state of the buffer 131 is the first state although reception of data is temporarily stopped, the terminal 100 may maintain playback of content during a longer time than the state of the buffer 131 is the second state.

Thus, if the state of the buffer 131 is the first state, the terminal 100 may measure a data throughput through a Wi-Fi network during a first time if an RSSI of Wi-Fi is better than a first RSSI value. If the state of the buffer 131 is the second state, the terminal 100 may measure a data throughput through the Wi-Fi network during a second time if the RSSI of the Wi-Fi is better than a second RSSI value. Since the terminal 100 longer stays in the Wi-Fi network upon the first state, the first RSSI value and the first time value may be set to be more advantageous than the second RSSI value and the second time, respectively.

If the state of the buffer 131 is determined, the terminal 100 may perform operation 205 and a subsequent process using a condition determined in operations 303, 309, 313, and 317. For example, the terminal 100 may determine whether current signal state of the Wi-Fi network meet a threshold condition determined in operations 303, 309, 313, and 317. If the current signal state of the Wi-Fi network meet the threshold condition, the terminal 100 may perform operation 209 during a time determined in operation 303, 309, 313, and 317.

Figure 4:
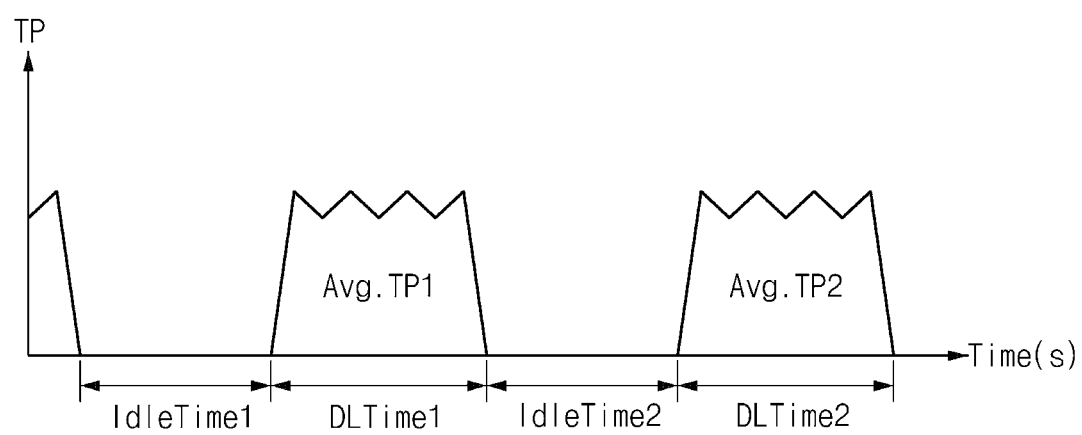
FIG. 4 illustrates a waveform chart of a traffic pattern according to an embodiment.
Figure 5:
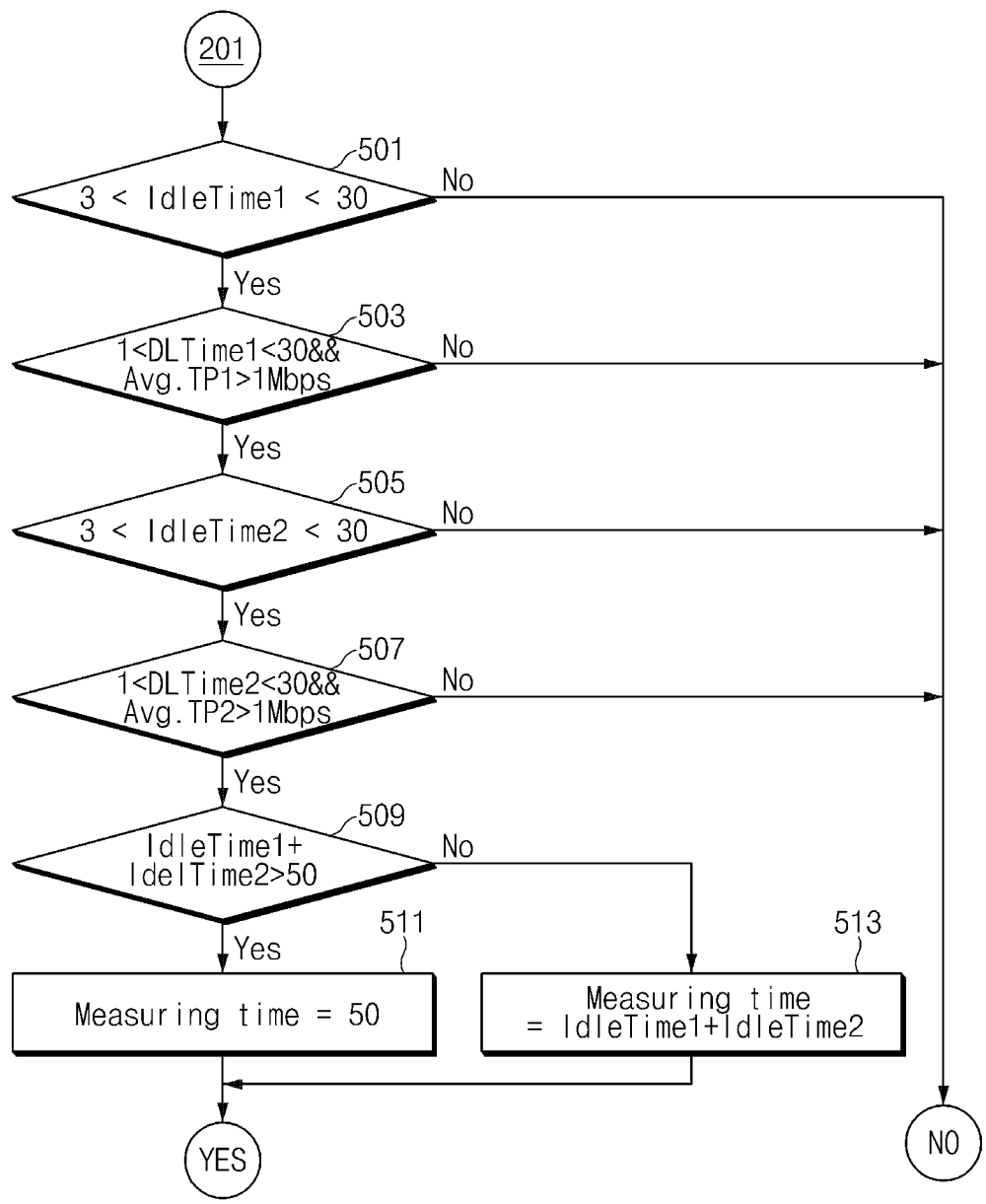
FIG. 5 illustrates a flowchart of a process for determining pattern detection and a Wi-Fi measuring time according to an embodiment.

FIG. 4 is a waveform chart illustrating a traffic pattern according to an embodiment. FIG. 5 is a flowchart illustrating a process of determining pattern detection and a Wi-Fi measuring time according to an embodiment.

In an embodiment, if data are sufficiently accumulated in a buffer 131 of FIG. 1, defined for an application to play back content, the application may periodically request a server 10 of FIG. 1 to transmit data for playing back content at intervals of a time, rather than continuously transmitting a request to transmit the data for playing back the content to the server 200. For example, if the buffer 131 is in a full state, the application (a processor 110 or a communication circuit 120 controlled by the processor 110) may wait during a first idle time IdleTime1 without requesting the server 200 to transmit data. If the first idle time IdleTime1 elapses, the application may request the server 200 to transmit data and may download content during a first download time DLTime1. Thus, traffic of the application may fail to be substantially generated during the first idle time IdleTime1, and traffic of the application may be increased to a level or more (e.g., Avg. TP1) during the first download time DLTime1. If a second idle time IdleTime2 and a second download time DLTime2 are repeatedly indicated in this manner, the terminal 100 may detect a specified traffic pattern and may determine that the buffer 131 is in the full state.

If such a traffic pattern of an idle time-download time is repeatedly indicated a number of times or more, the terminal 100 may determine that the specified traffic pattern is indicated. FIG. 5 illustrates an example of determining a Wi-Fi measuring time if the repeated number of times is specified as two times.

A process of FIG. 5 may be understood as detailed operations of operation 301 of FIG. 3. For example, if the process of FIG. 5 is determined as NO as a result of performing the process of FIG. 5, the process may proceed to NO of operation 301, that is, operation 305. If the process of FIG. 5 is determined as YES as a result of performing the process of FIG. 5, the process may proceed to YES of operation 301, that is, operation 303. In this case, a Wi-Fi measuring time determined in operation 511 or 513 may correspond to a Wi-Fi measuring time Timer1 of operation 303.

In operation 501, the terminal 100 may determine whether the first idle time IdleTime1 corresponds between 3 seconds and 30 seconds. If an idle time is too long or short, since a connection is temporarily ended, since download is completed, or since playback pauses, the terminal 100 may set a proper time period to a duration of the idle time.

In operation 503, the terminal 100 may determine whether the first download time DLTime1 between 1 second and 30 seconds and whether an average traffic Avg. TP1 is greater than or equal to 1 Mbps.

In operation 505, the terminal 100 may determine whether the second idle time IdleTime2 corresponds between 3 seconds and 30 seconds. A length of the second idle time IdleTime2 may be the same or different from a length of the first idle time IdleTime1. For example, if an idle time is predefined by a setting of an application or the like, the terminal 100 may wait without a request of data during the same time. However, if the idle time is dynamically changed based on a state of the buffer 131, network state, or the like, durations of the first idle time IdleTime1 and the second idle time IdleTime2 may differ from each other.

In operation 507, the terminal 100 may determine whether the second download time DLTime2 corresponds between 1 second and 30 seconds and whether an average traffic Avg. TP2 is greater than and equal to 1 Mbps.

If conditions of operations 501 to 507 are met (YES), in operation 509, the terminal 100 may determine whether the sum of the durations of the first idle time IdleTime1 and the second idle time IdleTime2 is greater than a predefined time (e.g., 50 seconds). If any one of the conditions of operations 501 to 507 is not met, the terminal 100 may determine that it fails to detect a specified pattern and may perform operation 305.

If the sum of the durations of the first idle time IdleTime1 and the second idle time IdleTime2 is greater than the predefined time, in operation 511, the terminal 100 may determine the predefined time as a Wi-Fi measuring time. If the sum of the durations of the first idle time IdleTime1 and the second idle time IdleTime2 is less than or equal to the predefined time, in operation 513, the terminal 100 may determine the sum of the durations of the first idle time IdleTime1 and the second idle time IdleTime2 as a Wi-Fi measuring time. However, in another embodiment, the terminal 100 may determine a Wi-Fi measuring time using another proper method or another proper numeric value.

Herein, if in such a case, a Wi-Fi measuring time determined according to pattern detection may be set to be longer than a Wi-Fi measuring time defined in operation 309.

Figure 6:
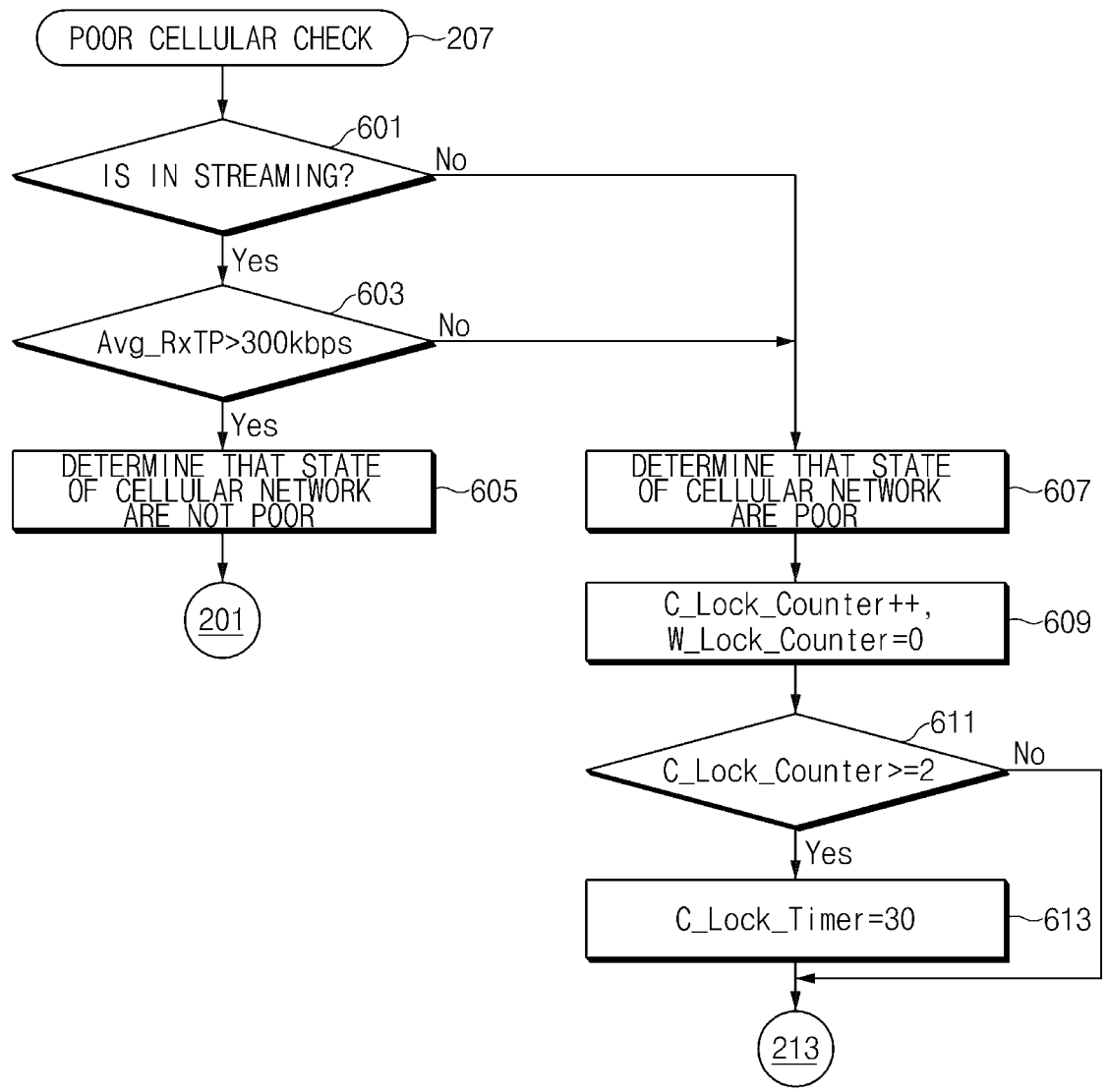
FIG. 6 illustrates a flowchart of a process for determining whether conditions of a cellular network are poor according to an embodiment.

FIG. 6 is a flowchart illustrating a process of determining whether conditions of a cellular network are poor according to an embodiment.

In operation 601, a terminal 100 of FIG. 1 may determine whether an application is currently in a streaming state, For example, the terminal 100 may determine whether a download speed of data is higher than 50 kbps under a condition in which operation 207 is performed in FIGS. 2 and 3. If the download speed of the data is lower than 50 kbps, in operation 607, the terminal 100 may determine whether current conditions of the cellular network are poor.

If it is determined that the application is in streaming, in operation 603, the terminal 100 may determine whether an average download speed is greater than or equal to 300 kbps. For example, if an average streaming traffic for 15 seconds is greater than 300 kbps, in operation 605, the terminal 100 may determine whether the current conditions of the cellular network are not poor. However, if the average streaming traffic is less than 300 kbps, in operation 607, the terminal 100 may determine whether the current conditions of the cellular network are poor.

In an embodiment, if it is determined that streaming is not performed during a specified time or more (e.g., 5 seconds or more), the terminal 100 may verify a transmit packet and a receive packet and may determine whether terminal 100 is connected to the cellular network. If it is determined that the terminal 100 is not connected to the cellular network, the terminal 100 may switch a data receive path to a Wi-Fi network.

In an embodiment, if it is determined that the current conditions of the cellular network are not poor, the terminal 100 may continue receiving data through the cellular network (e.g., operation 201 of FIG. 2).

In an embodiment, if it is determined that the current conditions of the cellular network are poor, the terminal 100 may switch the data receive path to the Wi-Fi network. At this time, if conditions of the Wi-Fi network are poor, the terminal 100 may prevent a ping-pong phenomenon between the cellular network and the Wi-Fi network. To prevent this ping-pong phenomenon, operations 609 to 613 may be performed.

For example, if it is determined that the conditions of the cellular network are poor, in operation 609, the terminal 100 may increase a C_Lock_Counter by 1. In this case, the terminal 100 may set a W_Lock_Counter to 0. Herein, in an embodiment, the terminal 100 may fail to perform the operation of setting the W_Lock_Counter to 0. If both of the C_Lock_Counter and the W_Lock_Counter are set in operation 609 and if it is determined that both of the cellular network and the Wi-Fi network are poor, the terminal 100 may be locked by the Wi-Fi network.

In operation 611, the terminal 100 may determine whether the C_Lock_Counter is greater than or equal to 2. In another embodiment, the terminal 100 may determine whether the C_Lock_Counter is greater than or equal to another proper natural number (e.g., 3 or 3 or more) except for 2.

If the C_Lock_Counter is 0 in operation 607, in operation 609, the C_Lock_Counter is 1. Since the C_Lock_Counter is 0, in operation 611, the terminal 100 may switch a data path to the Wi-Fi network and may receive data through the Wi-Fi network (e.g., operation 213 of FIG. 2).

However, if the data path is changed to the cellular network again because the conditions of the Wi-Fi network are poor, since the cellular network is still poor, the process of FIG. 6 may be executed again. In this case, since the C_Lock_Counter is 1 in operation 607 and since the C_Lock_Counter is 2 in operation 609, in operation 611, the process may proceed to operation 613. In operation 613, the terminal 100 may set a C_Lock_Timer to 30 (or a proper time). If the C_Lock_Timer is set, after switching to the Wi-Fi network, the terminal 100 may stay in the Wi-Fi network without returning to the cellular network during a time when the C_Lock_Timer is set. The terminal 100 may prevent an endless loop phenomenon between the Wi-Fi network and the cellular network through the process shown in FIG. 6. A process similar to that described with reference to FIG. 6 may be performed while data is downloaded through the Wi-Fi network. Further, a data path may be maintained during a time (e.g., a W_Lock_Timer) in the cellular network when both of conditions of the cellular network and the Wi-Fi network are poor by initializing the C_Lock_Counter in a process of downloading data through the Wi-Fi network rather than initializing the W_Lock_Counter in operation 609.

Figure 7:
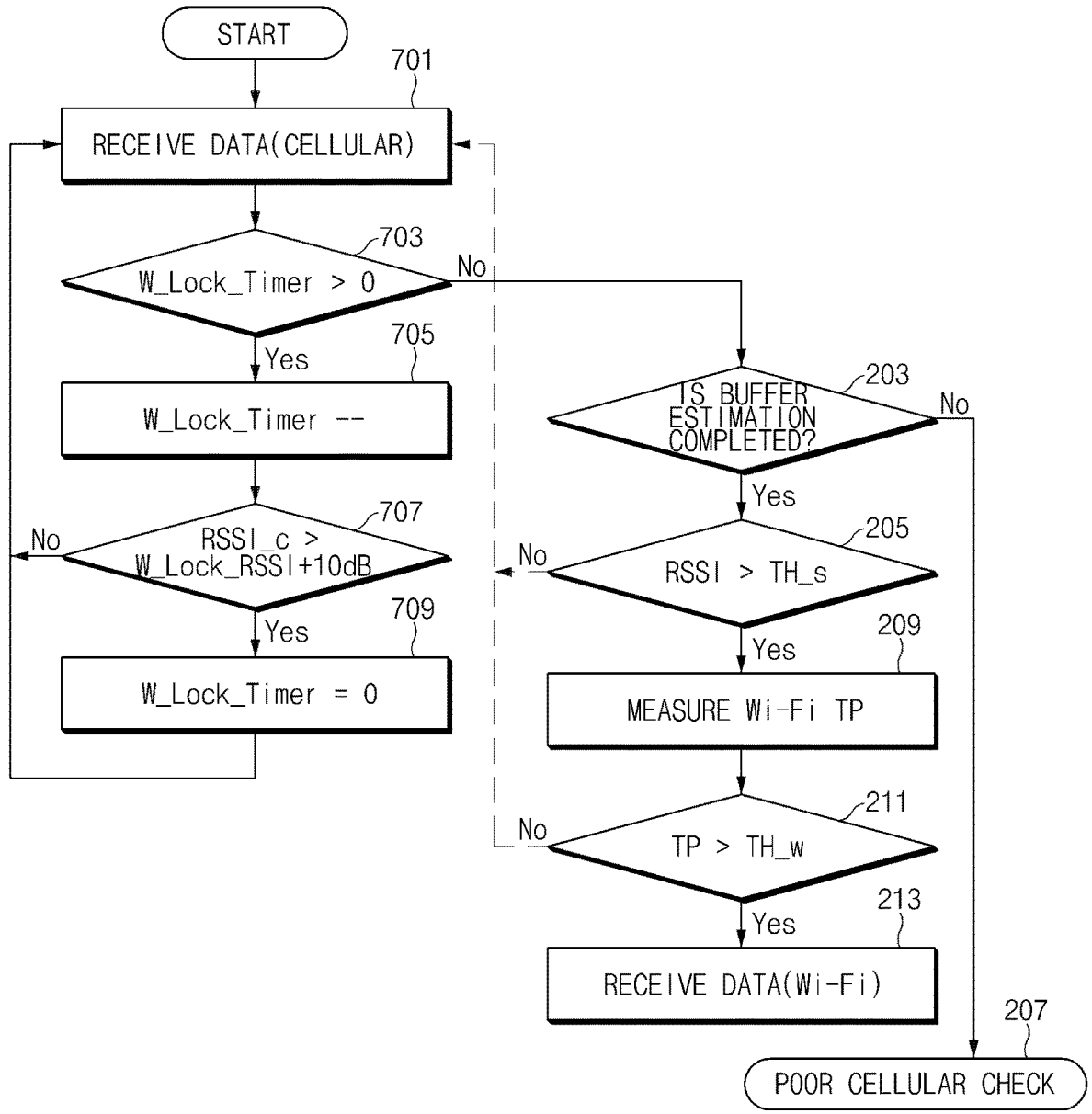
FIG. 7 illustrates a flowchart of a process for switching a data path from a cellular network to a Wi-Fi network according to an embodiment.

FIG. 7 is a flowchart illustrating a process of switching a data path from a cellular network to a Wi-Fi network according to an embodiment.

Referring to FIG. 7, in operation 701, a terminal 100 of FIG. 1 may receive data through a cellular network from a server 200 of FIG. 1. Operation 701 may correspond to operation 201 of FIG. 2.

In operation 703, the terminal 100 may determine whether a W_Lock_Timer expires. Herein, the W_Lock_Timer may correspond to, for example, a time set for the terminal 100 described with reference to FIG. 6 to stay to download streaming data associated with an application from the cellular network. If the W_Lock_Timer does not expire, that is, if the W_Lock_Timer is greater than 0, in operation 705, the terminal 100 may reduce the W_Lock_Timer.

In operation 707, the terminal 100 may determine whether signal strength RSSI_c of the cellular network is higher than a W_Lock_RSSI by a numeric value or more. If the signal strength RSSI_c of the cellular network is sufficiently high, since streaming data are sufficiently stacked in a buffer 131 of the terminal 100, in operation 709, the terminal 100 may immediately make the W_Lock_Timer expire, that is, set the W_Lock_Timer to 0. If the signal strength RSSI_c of the cellular network is lower than the W_Lock_RSSI, the terminal 100 may proceed to operation 701 and may continue receiving data associated with an application through the cellular network.

In operation 703, if the W_Lock_Timer expires, the terminal 100 may proceed to operation 203 and may determine a state of the buffer 131. The terminal 100 may maintain a current data path or may change to a data path using a Wi-Fi network, according to the result of estimating the buffer 131 or the determination of the conditions of the cellular network. Since operations associated with this are described with reference to FIGS. 2 to 6, they will be omitted.

Figure 8:
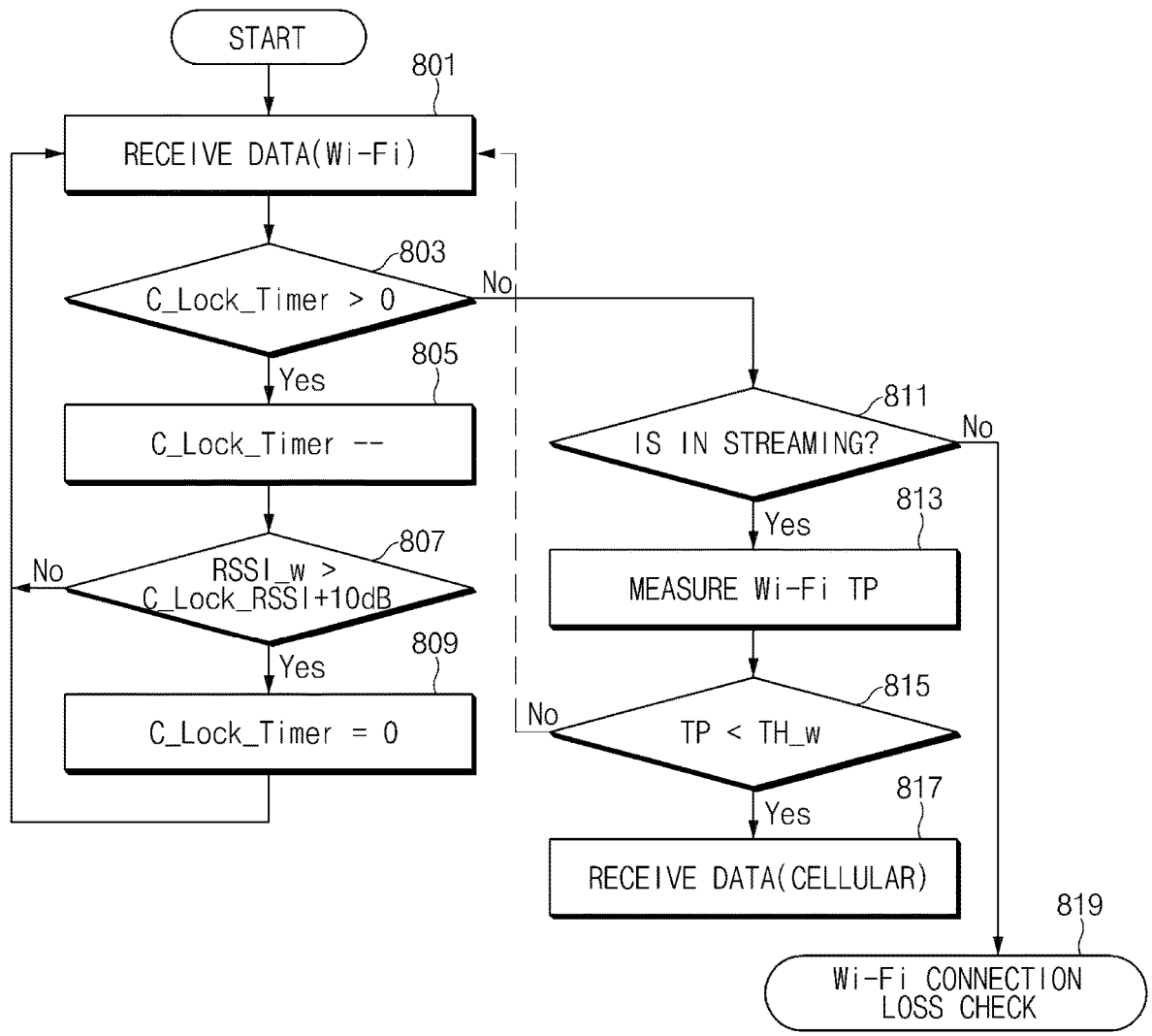
FIG. 8 illustrates a flowchart of a process for switching a data path from a Wi-Fi network to a cellular network according to an embodiment.

FIG. 8 is a flowchart illustrating a process of switching a data path from a Wi-Fi network to a cellular network according to an embodiment.

Referring to FIG. 8, in operation 801, a terminal 100 of FIG. 1 may receive data through a Wi-Fi network from a server 200 of FIG. 1. Operation 801 may be performed when an application initially start streaming data through the Wi-Fi network and may be performed when a data path changes to the Wi-Fi network by operation 213 of FIG. 2.

In operation 803, the terminal 100 may determine whether a C_Lock_Timer expires. If the C_Lock_Timer does not expire, that is, if the C_Lock_Timer is greater than 0, in operation 805, the terminal 100 may reduce the W_Lock_Timer.

In operation 807, the terminal 100 may determine whether signal strength RSSI w of the Wi-Fi network is higher than a C_Lock_RSSI by a numeric value or more. If the signal strength RSSI w of the cellular network is sufficiently high, since streaming data are sufficiently stacked in a buffer 131 of the terminal 100, in operation 809, the terminal 100 may immediately make the C_Lock_Timer expire, that is, may set the C_Lock_Timer to 0. If the signal strength RSSI w of the Wi-Fi network is lower than the C_Lock_RSSI, the terminal 100 may proceed to operation 801 and may continue receiving data associated with the application through the Wi-Fi network.

In operation 803, if the C_Lock_Timer expires, in operation 811, the terminal 100 may determine whether the application is currently in a streaming state. For example, the terminal 100 may determine whether a data receive rate is kept 50 kbps or more.

While the application is in streaming, in operation 813, the terminal 100 may measure a Wi-Fi TP. In operation 815, the terminal 100 may determine whether the measured throughput is an insufficient Wi-Fi TP. If it is determined that the measured throughput is the insufficient Wi-Fi TP, in operation 817, the terminal 100 may switch a data receive path to a cellular network. Operation 817 may correspond to operation 201 of FIG. 2. If the throughput is a sufficient Wi-Fi TP, the terminal 100 may continue receiving data through the Wi-Fi network in operation 801.

In an embodiment, the terminal 100 may determine a throughput using various methods. For example, the terminal 100 may determine sufficiency/insufficiency of a throughput based on an average value of the throughput measured during a time. As another example, the terminal 100 may determine a throughput using accumulation information of an average value of throughputs measured every second. As another example, the terminal 100 may determine a throughput based on a throughput peak value for past one second. Further, the terminal 100 may determine sufficiency/insufficiency of a throughput by using the above-mentioned one or more throughput conditions in a complex manner. Further, although the terminal 100 is located in the cellular network, it may determine sufficiency/insufficiency of a throughput in a similar method to that in the Wi-Fi network.

If it is determined that the terminal 100 is not in the streaming state in operation 811, the terminal 100 may determine whether the Wi-Fi connection is lost in operation 819. For example, similar to being described with reference to FIG. 6, if it is determined that streaming is not performed for a specified time or more (e.g., 5 seconds or more), the terminal 100 may verify a transmit packet and a receive packet and may determine whether terminal 100 is connected to the Wi-Fi network. If it is determined that the Wi-Fi connection is lost, in operation 817, the terminal 100 may switch a data receive path to the cellular network. If it is determined that the terminal 100 is connected to the Wi-Fi network as a result of verifying the transmit packet and the receive packet, in operation 801, the terminal 100 may continue receiving data through the Wi-Fi network.

Figure 9:
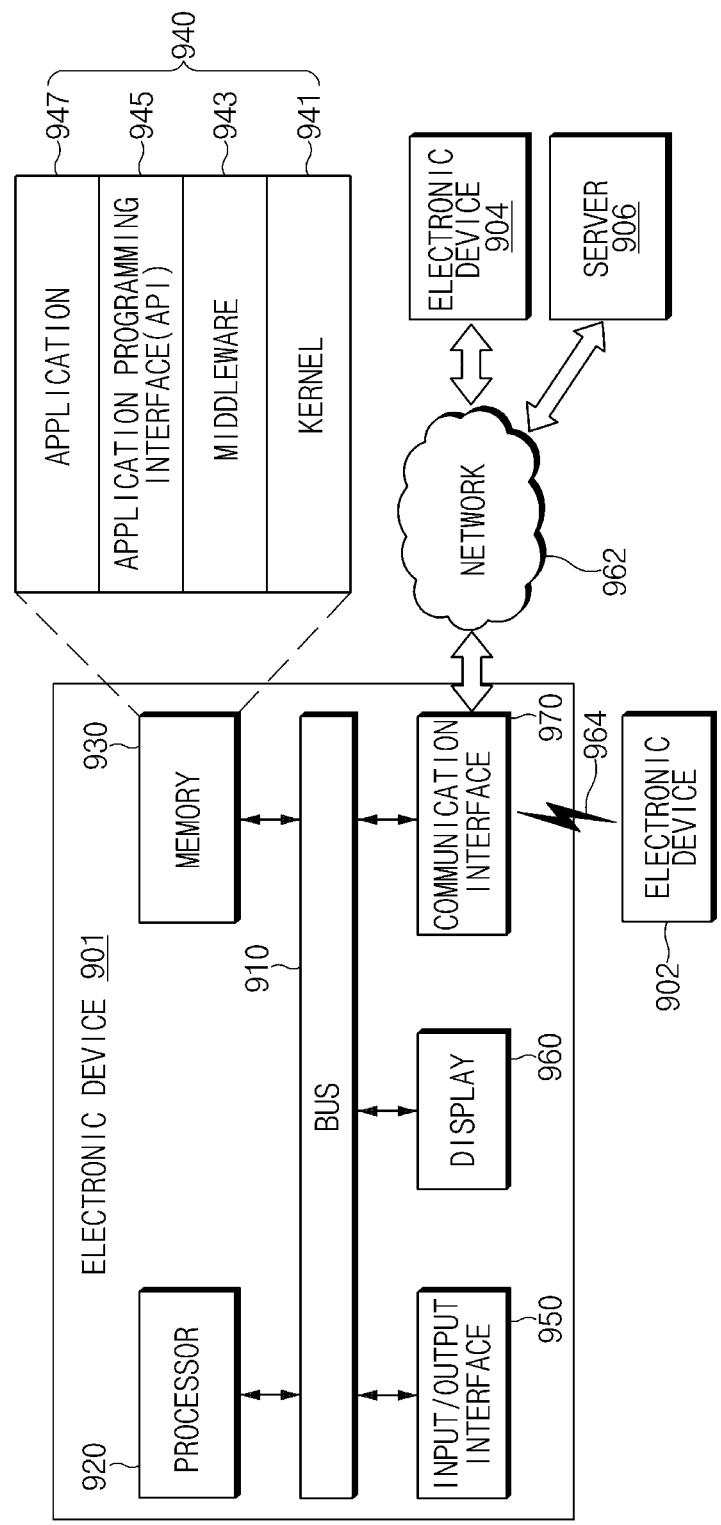
FIG. 9 illustrates an electronic device in a network environment, according to various embodiments.
Figure 10:
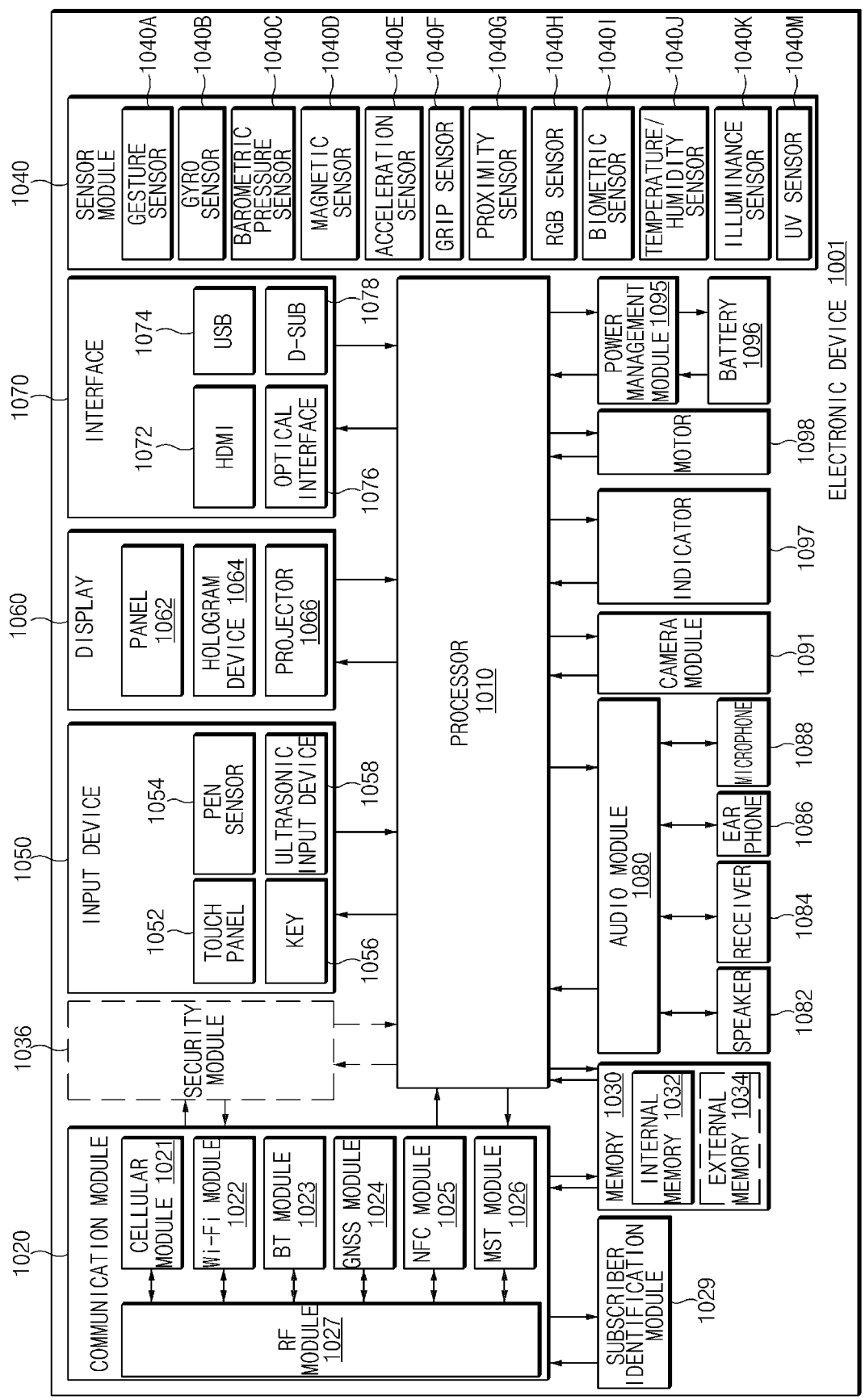
FIG. 10 illustrates a block diagram of an electronic device, according to various embodiments.
Figure 11:
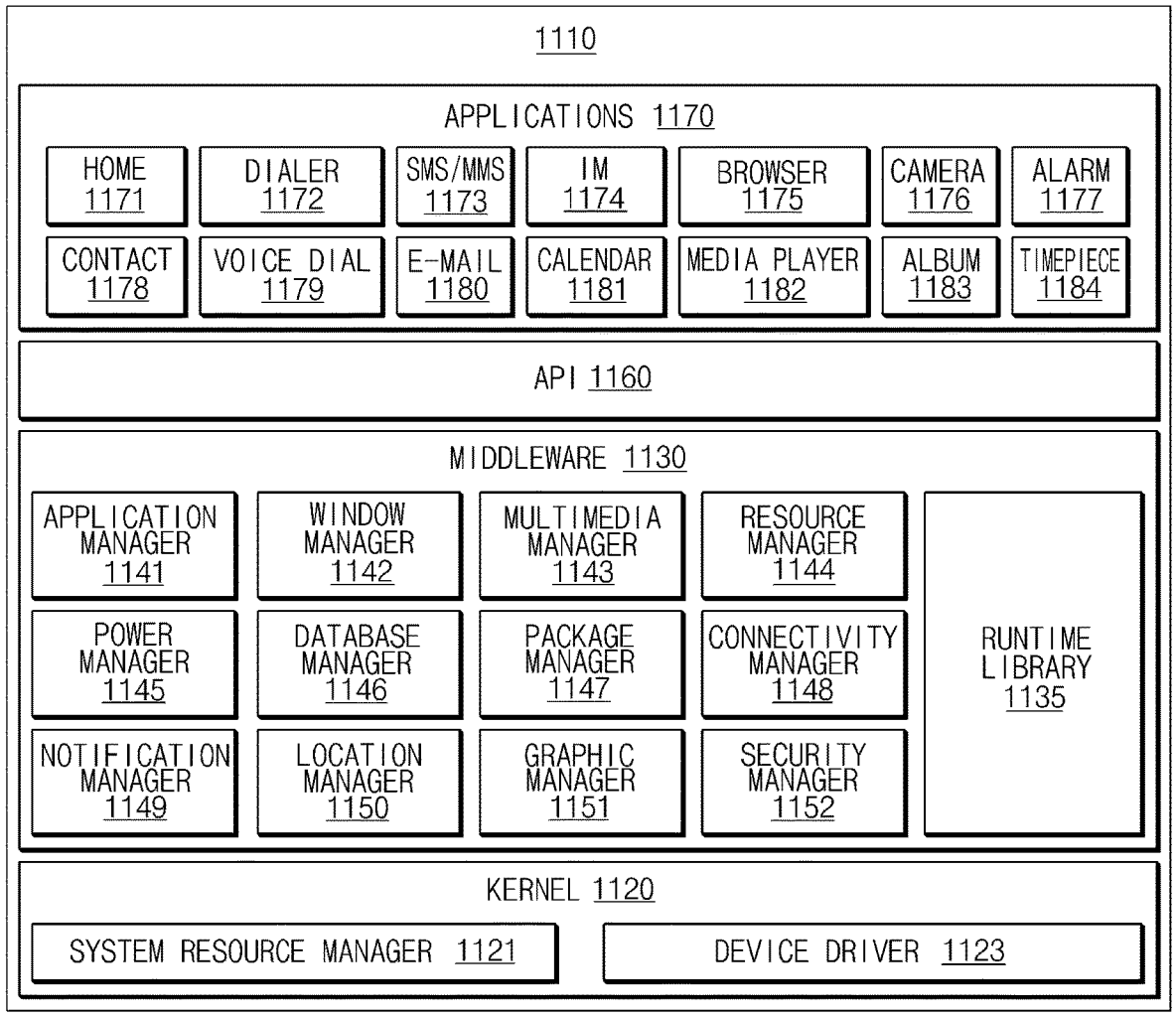
FIG. 11 illustrates a block diagram of a program module, according to various embodiments.

In various embodiments, the hardware/software elements of the terminal 100 may be expanded with reference to an electronic device disclosed in FIGS. 9 to 11.

FIG. 9 illustrates an electronic device in a network environment, according to various embodiments.

Referring to FIG. 9, according to various embodiments, an electronic device 901, a first electronic device 902, a second electronic device 904, or a server 906 may be connected with each other through a network 962 or local wireless communication 964. The electronic device 901 may include a bus 910, a processor 920, a memory 930, an input/output interface 950, a display 960, and a communication interface 970. According to an embodiment, the electronic device 901 may not include at least one of the above-described elements or may further include other element(s).

For example, the bus 910 may interconnect the above-described elements 910 to 970 and may include a circuit for conveying communications (e.g., a control message and/or data) among the above-described elements.

The processor 920 may include one or more of a central processing unit (CPU), an application processor (AP), or a communication processor (CP). For example, the processor 920 may perform an arithmetic operation or data processing associated with control and/or communication of at least other elements of the electronic device 901.

The memory 930 may include a volatile and/or nonvolatile memory. For example, the memory 930 may store instructions or data associated with at least one other element(s) of the electronic device 901. According to an embodiment, the memory 930 may store software and/or a program 940. The program 940 may include, for example, a kernel 941, a middleware 943, an application programming interface (API) 945, and/or an application program (or "an application") 947. At least a part of the kernel 941, the middleware 943, or the API 945 may be referred to as an "operating system (OS)".

For example, the kernel 941 may control or manage system resources (e.g., the bus 910, the processor 920, the memory 930, and the like) that are used to execute operations or functions of other programs (e.g., the middleware 943, the API 945, and the application program 947). Furthermore, the kernel 941 may provide an interface that allows the middleware 943, the API 945, or the application program 947 to access discrete elements of the electronic device 901 so as to control or manage system resources.

The middleware 943 may perform, for example, a mediation role such that the API 945 or the application program 947 communicates with the kernel 941 to exchange data.

Furthermore, the middleware 943 may process one or more task requests received from the application program 947 according to a priority. For example, the middleware 943 may assign the priority, which makes it possible to use a system resource (e.g., the bus 910, the processor 920, the memory 930, or the like) of the electronic device 901, to at least one of the application program 947. For example, the middleware 943 may process the one or more task requests according to the priority assigned to the at least one, which makes it possible to perform scheduling or load balancing on the one or more task requests.

The API 945 may be, for example, an interface through which the application program 947 controls a function provided by the kernel 941 or the middleware 943, and may include, for example, at least one interface or function (e.g., an instruction) for a file control, a window control, image processing, a character control, or the like.

The input/output interface 950 may play a role, for example, an interface which transmits an instruction or data input from a user or another external device, to other element(s) of the electronic device 901. Furthermore, the input/output interface 950 may output an instruction or data, received from other element(s) of the electronic device 901, to a user or another external device.

The display 960 may include, for example, a liquid crystal display (LCD), a light-emitting diode (LED) display, an organic LED (OLED) display, a microelectromechanical systems (MEMS) display, or an electronic paper display. The display 960 may display, for example, various contents (e.g., a text, an image, a video, an icon, a symbol, and the like) to a user. The display 960 may include a touch screen and may receive, for example, a touch, gesture, proximity, or hovering input using an electronic pen or a part of a user's body.

For example, the communication interface 970 may establish communication between the electronic device 901 and an external device (e.g., the first electronic device 902, the second electronic device 904, or the server 906). For example, the communication interface 970 may be connected to the network 962 over wireless communication or wired communication to communicate with the external device (e.g., the second electronic device 904 or the server 906).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the local wireless communication 964. The local wireless communication 964 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 901 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 962 may include at least one of telecommunications networks, for example, a computer network (e.g., LAN or WAN), an Internet, or a telephone network.

Each of the first and second electronic devices 902 and 904 may be a device of which the type is different from or the same as that of the electronic device 901. According to an embodiment, the server 906 may include a group of one or more servers. According to various embodiments, all or a portion of operations that the electronic device 901 will perform may be executed by another or plural electronic devices (e.g., the first electronic device 902, the second electronic device 904 or the server 906). According to an embodiment, in the case where the electronic device 901 executes any function or service automatically or in response to a request, the electronic device 901 may not perform the function or the service internally, but, alternatively additionally, it may request at least a portion of a function associated with the electronic device 901 at other electronic device (e.g., the electronic device 902 or 904 or the server 906). The other electronic device may execute the requested function or additional function and may transmit the execution result to the electronic device 901. The electronic device 901 may provide the requested function or service using the received result or may additionally process the received result to provide the requested function or service. To this end, for example, cloud computing, distributed computing, or client-server computing may be used.

FIG. 10 illustrates a block diagram of an electronic device, according to various embodiments.

Referring to FIG. 10, an electronic device 1001 may include, for example, all or a part of the electronic device 901 illustrated in FIG. 9. The electronic device 1001 may include one or more processors (e.g., an application processor (AP)) 1010, a communication module 1020, a subscriber identification module 1029, a memory 1030, a sensor module 1040, an input device 1050, a display 1060, an interface 1070, an audio module 1080, a camera module 1091, a power management module 1095, a battery 1096, an indicator 1097, and a motor 1098.

The processor 1010 may drive, for example, an operating system (OS) or an application to control a plurality of hardware or software elements connected to the processor 1010 and may process and compute a variety of data. For example, the processor 1010 may be implemented with a System on Chip (SoC). According to an embodiment, the processor 1010 may further include a graphic processing unit (GPU) and/or an image signal processor. The processor 1010 may include at least a part (e.g., a cellular module 1021) of elements illustrated in FIG. 10. The processor 1010 may load an instruction or data, which is received from at least one of other elements (e.g., a nonvolatile memory), into a volatile memory and process the loaded instruction or data. The processor 1010 may store a variety of data in the nonvolatile memory.

The communication module 1020 may be configured the same as or similar to the communication interface 970 of FIG. 9. The communication module 1020 may include the cellular module 1021, a Wi-Fi module 1022, a Bluetooth (BT) module 1023, a GNSS module 1024 (e.g., a GPS module, a Glonass module, a Beidou module, or a Galileo module), a near field communication (NFC) module 1025, a MST module 1026 and a radio frequency (RF) module 1027.

The cellular module 1021 may provide, for example, voice communication, video communication, a character service, an Internet service, or the like over a communication network. According to an embodiment, the cellular module 1021 may perform discrimination and authentication of the electronic device 1001 within a communication network by using the subscriber identification module (e.g., a SIM card) 1029. According to an embodiment, the cellular module 1021 may perform at least a portion of functions that the processor 1010 provides. According to an embodiment, the cellular module 1021 may include a communication processor (CP).

Each of the Wi-Fi module 1022, the BT module 1023, the GNSS module 1024, the NFC module 1025, or the MST module 1026 may include a processor for processing data exchanged through a corresponding module, for example. According to an embodiment, at least a part (e.g., two or more) of the cellular module 1021, the Wi-Fi module 1022, the BT module 1023, the GNSS module 1024, the NFC module 1025, or the MST module 1026 may be included within one Integrated Circuit (IC) or an IC package.

For example, the RF module 1027 may transmit and receive a communication signal (e.g., an RF signal). For example, the RF module 1027 may include a transceiver, a power amplifier module (PAM), a frequency filter, a low noise amplifier (LNA), an antenna, or the like. According to another embodiment, at least one of the cellular module 1021, the Wi-Fi module 1022, the BT module 1023, the GNSS module 1024, the NFC module 1025, or the MST module 1026 may transmit and receive an RF signal through a separate RF module.

The subscriber identification module 1029 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 1030 (e.g., the memory 930) may include an internal memory 1032 or an external memory 1034. For example, the internal memory 1032 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1034 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1034 may be operatively and/or physically connected to the electronic device 1001 through various interfaces.

A security module 1036 may be a module that includes a storage space of which a security level is higher than that of the memory 1030 and may be a circuit that guarantees safe data storage and a protected execution environment. The security module 1036 may be implemented with a separate circuit and may include a separate processor. For example, the security module 1036 may be in a smart chip or a secure digital (SD) card, which is removable, or may include an embedded secure element (eSE) embedded in a fixed chip of the electronic device 1001. Furthermore, the security module 1036 may operate based on an operating system (OS) that is different from the OS of the electronic device 1001. For example, the security module 1036 may operate based on java card open platform (JCOP) OS.

The sensor module 1040 may measure, for example, a physical quantity or may detect an operation state of the electronic device 1001. The sensor module 1040 may convert the measured or detected information to an electric signal. For example, the sensor module 1040 may include at least one of a gesture sensor 1040A, a gyro sensor 1040B, a barometric pressure sensor 1040C, a magnetic sensor 1040D, an acceleration sensor 1040E, a grip sensor 1040F, the proximity sensor 1040G, a color sensor 1040H (e.g., red, green, blue (RGB) sensor), a biometric sensor 1040I, a temperature/humidity sensor 1040J, an illuminance sensor 1040K, or an UV sensor 1040M. Although not illustrated, additionally or generally, the sensor module 1040 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1040 may further include a control circuit for controlling at least one or more sensors included therein. According to an embodiment, the electronic device 1001 may further include a processor that is a part of the processor 1010 or independent of the processor 1010 and is configured to control the sensor module 1040. The processor may control the sensor module 1040 while the processor 1010 remains at a sleep state.

The input device 1050 may include, for example, a touch panel 1052, a (digital) pen sensor 1054, a key 1056, or an ultrasonic input device 1058. For example, the touch panel 1052 may use at least one of capacitive, resistive, infrared and ultrasonic detecting methods. Also, the touch panel 1052 may further include a control circuit. The touch panel 1052 may further include a tactile layer to provide a tactile reaction to a user.

The (digital) pen sensor 1054 may be, for example, a part of a touch panel or may include an additional sheet for recognition. The key 1056 may include, for example, a physical button, an optical key, or a keypad. The ultrasonic input device 1058 may detect (or sense) an ultrasonic signal, which is generated from an input device, through a microphone (e.g., a microphone 1088) and may check data corresponding to the detected ultrasonic signal.

The display 1060 (e.g., the display 960) may include a panel 1062, a hologram device 1064, or a projector 1066. The panel 1062 may be the same as or similar to the display 960 illustrated in FIG. 9. The panel 1062 may be implemented, for example, to be flexible, transparent or wearable. The panel 1062 and the touch panel 1052 may be integrated into a single module. The hologram device 1064 may display a stereoscopic image in a space using a light interference phenomenon. The projector 1066 may project light onto a screen so as to display an image. For example, the screen may be arranged in the inside or the outside of the electronic device 1001. According to an embodiment, the display 1060 may further include a control circuit for controlling the panel 1062, the hologram device 1064, or the projector 1066.

The interface 1070 may include, for example, a high-definition multimedia interface (HDMI) 1072, a universal serial bus (USB) 1074, an optical interface 1076, or a D-subminiature (D-sub) 1078. The interface 1070 may be included, for example, in the communication interface 970 illustrated in FIG. 9. Additionally or generally, the interface 1070 may include, for example, a mobile high definition link (MHL) interface, a SD card/multi-media card (MMC) interface, or an infrared data association (IrDA) standard interface.

The audio module 1080 may convert a sound and an electric signal in dual directions. At least a part of the audio module 1080 may be included, for example, in the input/output interface 950 illustrated in FIG. 9. The audio module 1080 may process, for example, sound information that is input or output through a speaker 1082, a receiver 1084, an earphone 1086, or the microphone 1088.

For example, the camera module 1091 may shoot a still image or a video. According to an embodiment, the camera module 1091 may include at least one or more image sensors (e.g., a front sensor or a rear sensor), a lens, an image signal processor (ISP), or a flash (e.g., an LED or a xenon lamp).

The power management module 1095 may manage, for example, power of the electronic device 1001. According to an embodiment, a power management integrated circuit (PMIC), a charger IC, or a battery or fuel gauge may be included in the power management module 1095. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 1096 and a voltage, current or temperature thereof while the battery is charged. The battery 1096 may include, for example, a rechargeable battery and/or a solar battery.

The indicator 1097 may display a specific state of the electronic device 1001 or a part thereof (e.g., the processor 1010), such as a booting state, a message state, a charging state, and the like. The motor 1098 may convert an electrical signal into a mechanical vibration and may generate the following effects: vibration, haptic, and the like. Although not illustrated, a processing device (e.g., a GPU) for supporting a mobile TV may be included in the electronic device 1001. The processing device for supporting the mobile TV may process media data according to the standards of digital multimedia broadcasting (DMB), digital video broadcasting (DVB), MediaFLO™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

FIG. 11 illustrates a block diagram of a program module, according to various embodiments.

According to an embodiment, a program module 1110 (e.g., the program 940) may include an operating system (OS) to control resources associated with an electronic device (e.g., the electronic device 901), and/or diverse applications (e.g., the application program 947) driven on the OS. The OS may be, for example, Android, iOS, Windows, Symbian, or Tizen.

The program module 1110 may include a kernel 1120, a middleware 1130, an application programming interface (API) 1160, and/or an application 1170. At least a portion of the program module 1110 may be preloaded on an electronic device or may be downloadable from an external electronic device (e.g., the first electronic device 902, the second electronic device 904, the server 906, or the like).

The kernel 1120 (e.g., the kernel 941) may include, for example, a system resource manager 1121 or a device driver 1123. The system resource manager 1121 may control, allocate, or retrieve system resources. According to an embodiment, the system resource manager 1121 may include a process managing unit, a memory managing unit, a file system managing unit, or the like. The device driver 1123 may include, for example, a display driver, a camera driver, a Bluetooth driver, a shared memory driver, a USB driver, a keypad driver, a Wi-Fi driver, an audio driver, or an inter-process communication (IPC) driver.

The middleware 1130 may provide, for example, a function that the application 1170 needs in common, or may provide diverse functions to the application 1170 through the API 1160 to allow the application 1170 to efficiently use limited system resources of the electronic device. According to an embodiment, the middleware 1130 (e.g., the middleware 943) may include at least one of a runtime library 1135, an application manager 1141, a window manager 1142, a multimedia manager 1143, a resource manager 1144, a power manager 1145, a database manager 1146, a package manager 1147, a connectivity manager 1148, a notification manager 1149, a location manager 1150, a graphic manager 1151, or a security manager 1152.

The runtime library 1135 may include, for example, a library module that is used by a compiler to add a new function through a programming language while the application 1170 is being executed. The runtime library 1135 may perform input/output management, memory management, or capacities about arithmetic functions.

The application manager 1141 may manage, for example, a life cycle of at least one application of the application 1170. The window manager 1142 may manage a graphic user interface (GUI) resource that is used in a screen. The multimedia manager 1143 may identify a format necessary for playing diverse media files, and may perform encoding or decoding of media files by using a codec suitable for the format. The resource manager 1144 may manage resources such as a storage space, memory, or source code of at least one application of the application 1170.

The power manager 1145 may operate, for example, with a basic input/output system (BIOS) to manage a battery or power, and may provide power information for an operation of an electronic device. The database manager 1146 may generate, search for, or modify database that is to be used in at least one application of the application 1170. The package manager 1147 may install or update an application that is distributed in the form of package file.

The connectivity manager 1148 may manage, for example, wireless connection such as Wi-Fi or Bluetooth. The notification manager 1149 may display or notify an event such as arrival message, appointment, or proximity notification in a mode that does not disturb a user. The location manager 1150 may manage location information about an electronic device. The graphic manager 1151 may manage a graphic effect that is provided to a user, or manage a user interface relevant thereto. The security manager 1152 may provide a general security function necessary for system security, user authentication, or the like. According to an embodiment, in the case where an electronic device (e.g., the electronic device 901) includes a telephony function, the middleware 1130 may further include a telephony manager for managing a voice or video call function of the electronic device.

The middleware 1130 may include a middleware module that combines diverse functions of the above-described elements. The middleware 1130 may provide a module specialized to each OS kind to provide differentiated functions. Additionally, the middleware 1130 may dynamically remove a part of the preexisting elements or may add new elements thereto.

The API 1160 (e.g., the API 945) may be, for example, a set of programming functions and may be provided with a configuration that is variable depending on an OS. For example, in the case where an OS is the android or the iOS, it may provide one API set per platform. In the case where an OS is the tizen, it may provide two or more API sets per platform.

The application 1170 (e.g., the application program 947) may include, for example, one or more applications capable of providing functions for a home 1171, a dialer 1172, an SMS/MMS 1173, an instant message (IM) 1174, a browser 1175, a camera 1176, an alarm 1177, a contact 1178, a voice dial 1179, an e-mail 1180, a calendar 1181, a media player 1182, an album 1183, a timepiece 1184, health care (e.g., measuring an exercise quantity, blood sugar, or the like) or offering of environment information (e.g., information of barometric pressure, humidity, temperature, or the like).

According to an embodiment, the application 1170 may include an application (hereinafter referred to as "information exchanging application" for descriptive convenience) to support information exchange between an electronic device (e.g., the electronic device 901) and an external electronic device (e.g., the first electronic device 902 or the second electronic device 904). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 1170 may include an application (e.g., a health care application of a mobile medical device) that is assigned in accordance with an attribute of an external electronic device. According to an embodiment, the application 1170 may include an application that is received from an external electronic device (e.g., the first electronic device 902, the second electronic device 904, or the server 906). According to an embodiment, the application 1170 may include a preloaded application or a third party application that is downloadable from a server. The names of elements of the program module 1110 according to the embodiment may be modifiable depending on kinds of operating systems.

According to various embodiments, at least a portion of the program module 1110 may be implemented by software, firmware, hardware, or a combination of two or more thereof. At least a portion of the program module 1110 may be implemented (e.g., executed), for example, by the processor (e.g., the processor 1010). At least a portion of the program module 1110 may include, for example, modules, programs, routines, sets of instructions, processes, or the like for performing one or more functions.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in computer-readable storage media in the form of a program module. The instruction, when executed by a processor (e.g., the processor 920), may cause the one or more processors to perform a function corresponding to the instruction. The computer-readable storage media, for example, may be the memory 930.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of various embodiments of the present disclosure, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device, comprising:
   a processor configured to execute an application that communicates with a server using a pre-defined secure protocol;
   a communication circuit configured to receive contents associated with the application through a first network from the server; and
   a buffer configured to store the received contents,
   wherein the communication circuit is further configured to:
   determine a state of the buffer,
   determine a threshold value of a signal strength of a second network based on the state of the buffer which is determined based on an amount of the contents stacked in the buffer which are received from the server through the first network,
   in response to a signal state of the second network being greater than the threshold value, measure a data throughput of the second network for the server during a pre-defined measuring time,
if the measured data throughput meets a pre-defined condition, receive the contents through the second network,
if the state of the buffer is a first state, measure the data throughput of the second network for the server during a first time in case that the signal state of the second network is greater than a first threshold value; and
if the state of the buffer is a second state that is lower than the first state, measure the data throughput of the second network for the server during a second time in case that the signal state of the second network is greater than a second threshold value, the first time being longer than the second time.

2. The electronic device of claim 1, wherein the first network corresponds to a cellular network, and
wherein the second network corresponds to a wireless-fidelity (Wi-Fi) network.

3. The electronic device of claim 1, wherein the first network corresponds to a paid network, and
wherein the second network corresponds to a free network.

4. The electronic device of claim 1, wherein the pre-defined secure protocol corresponds to a hypertext transfer protocol over secure socket layer (HTTPS).

5. The electronic device of claim 1, wherein the communication circuit is further configured to:
if a pre-defined pattern is detected in traffic of data received through the first network from the server, determine the state of the buffer as a full buffer.

6. The electronic device of claim 5, wherein the pre-defined pattern comprises a repetition of an idle time of the traffic and a download time, and
wherein the communication circuit is further configured to determine the pre-defined measuring time based on duration of the idle time.

7. The electronic device of claim 1, wherein the communication circuit sets the first threshold value to be higher than the second threshold value.

8. The electronic device of claim 1, wherein the communication circuit is further configured to:
receive the contents associated with the application through a plurality of sessions established in the first network from the server,
establish a first session for receiving streaming data of the contents among the plurality of sessions in the second network, and
measure the data throughput of the second network for the server through the first session established in the second network.

9. A content streaming method in an electronic device, the method comprising:
receiving data using a pre-defined secure protocol through a first network from a server;
determining a state of a buffer that stores the data;
determining a threshold value of a signal strength of a second network based on the state of the buffer which is determined based on an amount of the contents stacked in the buffer which are received from the server through the first network;
in response to a signal state of the second network being greater than the threshold value, measuring a data throughput of the second network for the server during a pre-defined measuring time; and
when the measured data throughput meets a pre-defined condition, receiving the content through the second network,
wherein the measuring of the data throughput of the second network comprises:
when the state of the buffer is a first state, measuring the data throughput of the second network for the server during a first time in case that the signal state of the second network is greater than a first threshold value; and
when the state of the buffer is a second state that is lower than the first state, measuring the data throughput of the second network for the server during a second time set to be longer than the first time in case that the signal state of the second network is greater than a second threshold value.

10. The method of claim 9, wherein the determining of the state of the buffer comprises:
when a pre-defined pattern is detected in traffic of data received through the first network from the server, determining the state of the buffer as a full buffer.

11. The method of claim 9, further comprising:
determining the pre-defined measuring time based on the state of the buffer.

12. An electronic device, comprising:
a processor configured to execute an application that communicates with a server using a pre-defined secure protocol;
a memory configured to store the application;
a communication circuit configured to receive data through a first session established between the electronic device and the server in a first network; and
a buffer configured to store the received data,
wherein the processor is further configured to allow the communication circuit to:
determine a state of the buffer,
determine a threshold value of a signal strength of a second network based on the state of the buffer which is determined based on an amount of content stacked in the buffer which are received from the server through the first network,
in response to a signal state of the second network being greater than the threshold value, measure a data throughput through a second session established between the electronic device and the server during a measuring time determined according to the state of the buffer, based on the state of the buffer and the signal state of the second network,
if the measured data throughput meets a pre-defined condition, receive the data through the second session,
if a pre-defined pattern is detected in traffic of data received through the first network from the server, determine the state of the buffer as a full buffer,
wherein the pre-defined pattern comprises a repetition of an idle time of the traffic and a download time, and
wherein the communication circuit is further configured to determine the measuring time based on duration of the idle time.

13. The electronic device of claim 12, wherein the communication circuit includes the buffer.

14. The electronic device of claim 12, wherein the buffer is configured to correspond to a partial area of the memory.

15. The electronic device of claim 12, wherein the data corresponds to audio or video contents being used in the application.

16. The electronic device of claim 12, wherein the predefined secure protocol corresponds to an HTTPS.

\* \* \* \* \*